United States Patent [19]

Bergna et al.

[11] 4,131,542

[45] Dec. 26, 1978

[54] SPRAY DRIED SILICA FOR CHROMATOGRAPHY

[75] Inventors: Horacio E. Bergna; Joseph J. Kirkland, both of Wilmington, Del.

[73] Assignee: E. I. DuPont de Nemours and Company, Wilmington, Del.

[21] Appl. No.: 817,060

[22] Filed: Jul. 19, 1977

[51] Int. Cl.² .................................... B01D 15/08
[52] U.S. Cl. ........................... 210/31 C; 55/67;
  55/386; 210/198 C; 210/502; 252/448; 252/451
[58] Field of Search ................ 210/31 C, 198 C, 502;
  55/386, 67; 252/448, 449, 451; 423/338

[56] References Cited

U.S. PATENT DOCUMENTS

| | | | |
|---|---|---|---|
| 3,301,635 | 1/1967 | Bergna et al. | 252/448 X |
| 3,397,153 | 8/1968 | Sippel | 252/451 X |
| 3,782,075 | 1/1974 | Kirkland | 210/198 C |
| 3,872,217 | 3/1975 | Meaz et al. | 423/338 |

Primary Examiner—John Adee

[57] ABSTRACT

A process for preparing a low-cost silica packing for chromatography is disclosed. The process involves spray-drying an aqueous silica sol containing from 5 to 60 weight percent silica, to form porous micrograins having a dense packing, acid-washing the porous micrograins, and sintering to effect a 5 to 20% loss in surface area.

11 Claims, 6 Drawing Figures

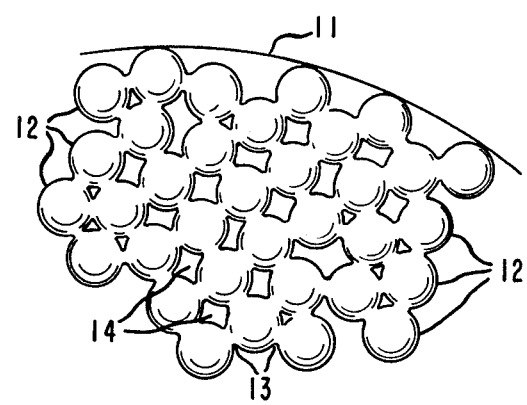
FIG. 1
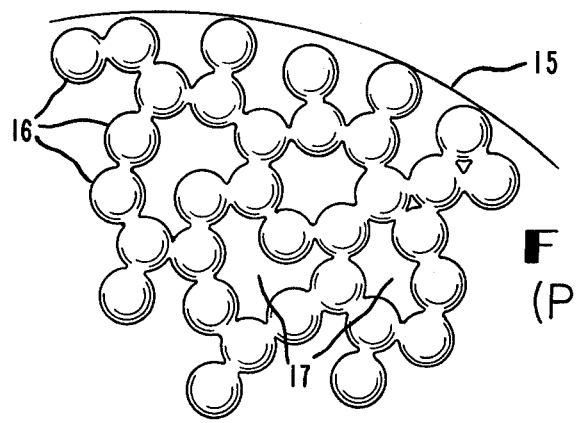
FIG. 2
(Prior Art)
FIG. 3
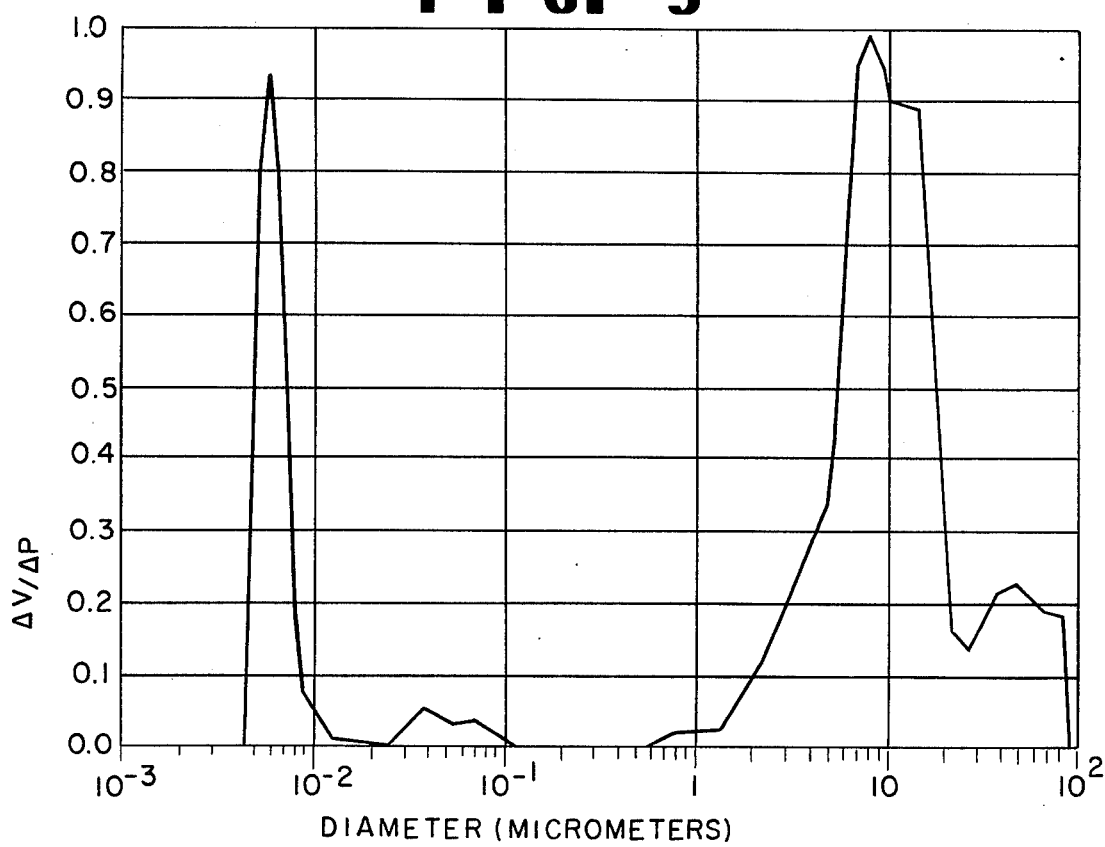

SPRAY DRIED SILICA FOR CHROMATOGRAPHY

BACKGROUND OF THE INVENTION

The present invention relates to a process of preparing a packing for a chromatographic column. In a chromatographic process, it is customary to pass a mixture of the components to be resolved in a carrier fluid through a chromatographic apparatus or separative zone. The separative or resolving zone generally consists of a material which has an active chromatographic sorptive function.

The chromatographic apparatus generally employed uses columns. These are open tubes which have been packed with a granular material. In preparative chromatography the columns can be of substantial size and require packings having substantial strength or crush resistance. Commonly employed packing materials are granules having sorptively active surfaces, surfaces which have been coated with a substance which is sorptively active, or granules which have pore structures capable of separating components according to size. Passing the mixture to be separated through the column results in repeated interactions associated with the chemical or physical nature of the different components and the chromatographically-active packing. Different components will have different retention times on the column due to these repeated interactions. The column eluent is generally passed through an analyzer, for example, an ultraviolet absorption detector, to determine when the resolved components emerge from the colunm and the concentrations of each.

It has long been recognized that ideal chromatographic supports would consist of a plurality of discrete porous grains of regular shape, preferably spherical. In order for different columns to give reproducible results, not only should the packing be regular, but particle surface and porosity characteristics readily controllable and reproducible. This has been very difficult to realize in practice with the result that the cost of the column packings has inhibited the use of liquid chromatography to separate materials on an industrial scale.

SUMMARY OF THE INVENTION

The present process involves spray-drying an aqueous silica sol in a manner similar to that disclosed in U.S. Pat. No. 3,301,635, issued Jan. 31, 1967 to H. E. Bergna et al. to form aggregates which are then acid washed, and sintered. As pointed out in Kirkland, U.S. Pat. No. 3,782,075, it had been previously believed that size distribution of spray dried materials was too large for them to be useful in chromatography. However, the present spray-drying techniques, combined with careful particle sizing, has resulted in materials with chromatographic utility. Most important, the spray-dried materials of U.S. Pat. No. 3,301,635 lack the purity and mechanical strength required for many chromatographic applications. In the present process, spray-dried spheroidal aggregates previously believed unsuitable for chromatography, are acid-washed and carefully sintered to produce the desired chromatographic packing particles.

BRIEF DESCRIPTION OF THE DRAWINGS

FIG. 1 is a partial schematic cross-section of a spray-dried spheroid of the present invention.

FIG. 2 is a partial schematic cross-section of a prior art porous microsphere.

FIG. 3 is a plot showing mercury porosimetry measurements on the porous spherical micrograins of the present invention.

DESCRIPTION OF THE DRAWINGS

Figure 4:
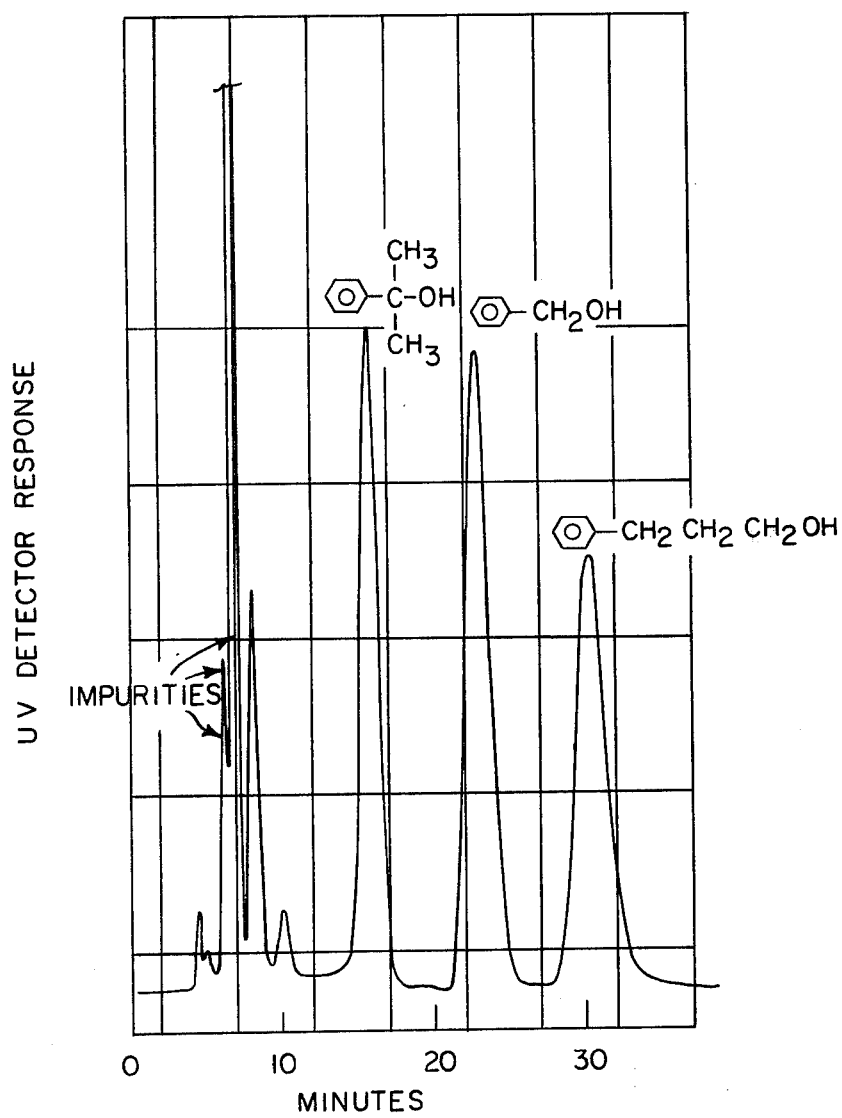
FIG. 4 shows a high efficiency separation of a mixture of hydroxylated aromatic compounds using liquid-solid chromatography and one of the chromatographic column packings made by the process of the present invention.

FIG. 1 is a partial schematic cross-section of a spray-dried porous micrograin (PMG) of the present invention, the outer periphery being shown at 11. The constituent particles 12 are relatively uniform in size in one product but the average diameter in different products may vary from 5 to 80 nm (nanometers = millimicrons). They are discrete, dense spherical particles of amorphous silica as derived from the ultimate particles in the silica sol from which they derived. The particles are sintered together at their contact points 13 and the pores at 14 generally comprise less than 45% by volume, and the silica more than 55%. Empty spaces in the closest arrangement for a packing of uniform spheres ("rhombohedral" type of packing with coordination number 12) occupies 25.95 percent of the total volume. ("Micromeritics", J. M. Dalla Valle, Pitman Publishing Co., N.Y., 1943.) Theoretical maximum volume occupied by the solid spheres is therefore 74.05 percent of the total volume.

FIG. 2 is a similar type of cross-sectional representation of a porous microsphere disclosed by Kirkland in U.S. Pat. No. 3,782,075. The outer periphery of the spheroid is at 15, the microparticles of silica are at 16 and the pores are at 17. The pores in this case comprise more than 50% of the volume of the spheroid and the silica less than 50% of the volume.

It can be seen intuitively that the structure of FIG. 1, being more densely packed, will have a greater compressive strength than the structure of FIG. 2. The microbead of FIG. 2 is prepared by the process disclosed in Iler-McQueston U.S. Pat. No. 4,010,242 (3/1/77) which discloses heating the urea-formaldehyde resin-encapsulated silica beads to remove the organic matter. These microbeads, which are claimed as a chromatographic adsorbent or column packing by Kirkland in U.S. Pat. No. 3,782,075 (1/1/74), have a porosity of over 50% by volume (i.e., silica occupies less than 50% by volume of the microbead).

On the other hand, spray-dried PMG of the present invention are somewhat less porous, i.e., less than 45% by volume, because upon spray-drying the colloidal silica particles become very closely packed due to surface tension effects of water on the particle surface as the aquasol is dried. This results in a stronger, harder structure than obtainable from Iler-McQueston microbeads, especially after proper sintering to slightly decrease the surface area. The resulting improved particle strength is important for certain chromatographic applications, particularly in large industrial separation columns. Further, because of their chemical purity and high mechanical strength, the PMG of the present invention are very resistant to high temperatures, making them suitable for use in hostile environments, such as in columns for enrichment of spent radioactive fuels. Further, the close-packed uniform grains have more uniform pores than the porous microspheres left after burnout of urea-formaldehyde resin.

DETAILED DESCRIPTION

To make the amorphous silica aggregates of the present invention one first prepares or obtains a suitable silica sol and then dries the sol under conditions which lead to the desired products. The sols that are suitable as starting materials, and the drying, acid-treatment and sintering step will now be described in detail.

The starting sol must first of all be a dispersion of amorphous silica ultimate particles having a diameter of from 5 to 80 nm. Since the silica in the ultimate product is to be amorphous it is important that the silica particles in the starting sol be free of crystallinity. Methods for determining the presence of crystallinity by X-ray techniques are discussed in R. B. Sosman's "The Properties of Silica", Chemical Catalog Company, Inc., New York, N.Y., 1927, page 207.

Also, as observed by the electron microscopy, the ultimate silica particles in the sol should be uniform-sized and spheroidal. By uniform-sized is meant that 75% of the total number of particles have a diameter in the range of 0.5D to 2D where D is the weight average particle diameter. The uniform size is important in that it produces uniform pore openings in the product resulting in superior chromatographic separations performed using the silica packings of the present invention. The uniformity of the particles can be determined by methods described in the "Journal of Physical Chemistry", 57 (1953), page 932. The uniformity of the ultimate silica particles should be unimodal. That is, the particle size distribution curve should have only one peak.

The size of the ultimate silica particles in the sol can also be determined by methods described in the "Journal" article just mentioned. For making the novel silica of the present invention the average ultimate particle size of the starting sol should be in the range of 5 to 80 nm and preferably 8 to 50 nm. Particles above about 80 nm give silica aggregates which do not have the desired strength.

Sols containing silica particles smaller than 5 nm, such as those obtained by neutralizing sodium silicate with sulfuric acid, for instance, are not satisfactory because the particles tend to aggregate very rapidly and irreversibly. When such sols are freed of stabilizing ions they show a rapid increase in viscosity and tend to gel in extremely short times producing aggregates with nonuniform pore sizes.

The liquid phase of the silica sol is preferably water because they are less expensive than organosols and generally are easier to use. Thus, the preferred sols are aquasols. However, in some cases there may be advantages in having minor amounts of water miscible organics such as alcohols or ethylene glycol present. In some instances it may be desirable to use organosols.

The art is already familiar with methods for making silica aquasols in the size range above specified and any of these methods may be used to make the starting material employed in the process of the present invention. A particularly preferred type of aquasol is described in U.S. Pat. No. 2,574,902, issued Nov. 13, 1951 to Bechtold et al. This patent describes how the size of the ultimate silica particles is increased into the desired range by adding quantities of a low molecular weight silica feed sol to a heel sol containing silica particles which have grown substantially. To minimize the amount of alkali contained in the silica particles it is preferred to use ammonium hydroxide as the stabilizing alkali used to adjust the ratio as described in the patent.

Regardless of its method of preparation, the silica sol should be purified of all nonvolatile components other than silica. By nonvolatile is meant components which will not be volatilized off or burned out at temperatures below or equal to the sintering temperature of the silica. Inorganic anions and cations are included among nonvolatile constituents and can be removed, if soluble, by deionizing the silica with a mixture of anion and cation exchange resins in accordance with processes described in U.S. Pat. No. 2,577,458, issued Dec. 4, 1951 to J. M. Rule. Optionally the sol can contain up to 1% sodium or other alkali metal ions as based on the aquasol, which is later leached out prior to sintering. The sol is preferably stabilized against gelling or aggregation of the ultimate spheroidal particles by adjusting the pH to between 8 and 9 with a volatile base such as ammonia. Alternatively, the sol may be temporarily stabilized by adjusting the pH to the range of 1 to 3 with a volatile strong acid such as hydrochloric acid or nitric acid.

The purity of the silica aggregates obtained by drying the sol is important in that the aggregates must not contain substances which promote the devitrification of silica at the sintering temperature. Thus, substantial quantities of impurities such as the alkali and alkaline earth oxides are especially to be avoided and these compounds should be removed as thoroughly as possible from the sol employed in making the silica aggregates.

Having prepared a suitable amorphous silica starting sol, it is dried to a densely packed PMG. The sol is dried to PMG before any substantial increase in viscosity has occurred and at a rate which is substantially instantaneous after the silica concentration in the liquid sol phase approaches 50%. After the sol has been deionized so that stabilizing ions have been removed, it is in a metastable state and has a pronounced tendency to gel. This tendency is marked, in its incipient stages, by an increase in the viscosity of the sol. In the present invention, spray drying is used to achieve this rapid drying of the sol.

Generally for large PMG the concentration of the sol sprayed should be as high as possible. The approximate maximum concentration of sols that are available or can be made depends on particle size: the approximate maximum concentration is reported in Table I.

TABLE I

| Particle Diameter | % SiO$_2$ by weight in the sol |
|---|---|
| 5 nm | 15 |
| 10 nm | 30 |
| 15 nm | 40 |
| 25 nm | 50 |
| 50 nm | 60 |
| 80 nm | 60 |

However, for smallest PMG size the concentration generally should be as low as practical, which is determined by equipment and drying conditions. Generally the lowest practical concentration is between 5 and 10 wt. % silica. Generally about 60 wt. % silica is the maximum that a large particle size sol can contain.

The degree of aggregation of the particles in the sol should be as low as possible in order to produce the dense uniform sized aggregates desired. As discussed by Iler and Dalton, *Journal of Physical Chemistry*, Vol. 60, pages 955–957 (1956), a sol containing only discrete particles (no aggregates) will have a maximum S value which can be determined from viscosity measurements and calculated by one skilled in the art. Thus, if one finds difficulty in obtaining aggregates containing over 55% by volume silica, the S value of the starting sol should be examined. At pH 5-6 the sol may gel before spraying and the aggregates will not contain greater than 55% by volume silica. This is especially true of sols containing particles less than 10 nm in diameter which have a greater tendency to gel.

Spray-drying is the transformation of a silica feed from a fluid state into a dried form by spraying the feed into a hot drying medium or into a drying medium just warmed over atmospheric temperatures (low temperature spray-drying) or into freezing air (spray freeze-drying). In the case of spray freeze-drying the individual droplets are frozen for subsequent removal through sublimation under vacuum. Should the temperature of the air permit only solidification of the spray droplets, the process is termed spray-cooling. According to the literature ("Spray Drying", K. Masters, Leonard Hill Books, London, 1972) the spray-drying process consists of four stages:

I. Atomization of feed into a spray.
II. Mixing and flow to produce spray-air contact.
III. Drying of spray by moisture removal.
IV. Separation of dried product from the air.

The characteristics of the dried product are determined by the physical and chemical properties of the feed and by the conditions used in each of the four stages of the process. All stages influence our dried product properties to a degree. Atomization technique and feed properties have a bearing on PMG distribution, bulk density, and moisture content. Spray-drying contact and resulting evaporation, in fact the drying operation, have a bearing on bulk density, moisture content, and friability. Techniques for product-air separation determine the degree of comminution the powder undergoes following completion of drying. Many operational variables associated with atomization and the drying operation offer means of altering dried product characteristics. The important variables are listed below.

1. Ultimate Particle Size of the Feed

The feed in most cases is a silica aquasol, otherwise a silica organosol is used. A silica sol is a colloidal solution of silica in water (aquasol) or an organic solvent (organosol). The diameter of the ultimate colloidal silica particles is between 5 and 80 nm. The diameter of the sol ultimate particles determines the pore size and pore size distribution in the porous micrograin PMG of the dried product. Preferably the PMG are spherical.

2. Concentration of Solids in the Feed

Increase in feed solids increases the size of the PMG of the dried product. Obviously the higher the amount of solids in the droplets of the spray, the larger the amount of solids in the dried PMG and, therefore, the larger the size of the PMG.

Concentrations of solids in the feed have also an influence on shape of the PMG. As feed solids are increased at constant drying temperatures and feed rates, the reduced evaporation load will result in products of lower moisture content. There will be greater tendency for such rapid moisture evaporation so that hollow dried PMG (amphora) results and overall bulk densities are lower. These amphora are useful but generally less preferred than uniform spherical PMG. This effect is counteracted to a certain extent by individual spray droplets being larger and the weight of moisture per given droplet remaining approximately the same.

The bulk density of the powder obtained is a combination of the effect of the number of hollow PMG (and the size and shape of the holes or cavities of the PMG) and the size of the PMG (which is in turn determined by the size of the spray droplets).

3. Viscosity and Temperature of the Feed

The higher the vicosity of the feed, the coarser the spray at constant atomizing conditions will be and therefore larger PMG will be obtained. Vicosity is influenced by feed concentration and, in some cases, by temperature.

Other than the influence on viscosity, the effect of feed temperature is negligible. The possible increase in feed heat content is small compared to heat requirements for evaporation.

4. Surface Tension of the Feed Solution

Surface tension effects dried product properties by influencing the mechanisms of atomization and spray-drying. Low surface tension feeds produce smaller spray droplets. Sprays contain an increasing proportion of very fine droplets and spray distributions tend to become wider. The fines fractions are dried to lower moisture levels.

High values of surface tension produce larger droplet sizes, and size distributions tend towards being narrower.

Surface tension of the feed may be lowered through addition of surface wetting agents. However, the surface tension of the silica aquasols feeds fall within a range too narrow to have a pronounced influence on dried product properties. A more effective way of changing the surface tension of the feed is to transfer the silica aquasol particles from the water to another solvent with very different surface tension. For example, silica organosols using alcohol, dimethyl formamide, benzene, etc., instead of water as dispersant can be used for spray-drying.

5. Feed Rate

Increase of feed rate at constant atomizing and drying conditions increases PMG size and bulk density of the dried product. Decrease of feed rate decreases, in general, the outlet temperature in the spray-dryer and, therefore, there is less tendency to obtain hollow PMG.

Changes in feed rate normally do not produce changes in the deviation of the PMG size distribution.

Besides the feed properties and feed rate, the following variables in dryer design and operation affect the characteristics of the dried product.

I. Atomization of Feed into a Srapy

The characteristic features of spray-drying are the formation of a spray, commonly referred to as "atomization", and the contacting of the spray with air. The atomization step must create a spray for optimum evaporation conditions leading to a dried product of required characteristics. Therefore, the selection and the manner of operation of the atomizer are of decisive importance in determining the kind of product obtained.

1. Type of Atomizer

The different atomization techniques available concern the different energy forms applied to the liquid bulk. Common to all atomizers is the use of energy to build-up liquid bulk. Centrifugal, pressure, kinetic energy are the common forms and each classify the atomizer device. Sonic and vibratory atomizers can also be used to atomize our compositions.

Centrifugal energy is used in rotary atomizers which feature high velocity discharge of liquid from the edge of a vaned wheel or a vaneless disc. Both rotary wheels and rotary discs (cups, bowls or plates) are described in the literature.

Pressure energy is used in pressure nozzles, which feature the discharge of liquid under pressure through an orifice. This type of nozzle is described in the literature. For use herein pressure nozzles are less preferred than rotary atomizers.

Kinetic energy is used in pneumatic nozzle to break up the liquid on impact with high velocity air or other gaseous flow. Two fluid pneumatic nozzles with internal or external mixing as described in the literature may be used.

Sonic energy is used in sonic nozzles to break up the liquid through sonic excitation. Sonic nozzles are recommended to obtain products of very small PMG size (1 to 5 $\mu$m), but are less preferred than rotary atomizers when larger particle sizes are required.

2. Atomization Energy

In all atomizer types, increased amounts of energy available for liquid atomization result in sprays having smaller droplet sizes. Higher energy of atomization means more break up of the liquid giving a finer mist and therefore smaller PMG. Increase in rotary atomizer speed, nozzle pressure, or air-liquid flow ratio in two-fluid nozzles will decrease mean spray droplet size. The spread of droplet sizes in the spray distribution is not appreciably changed. If the available atomization energy is held constant but the feed rate is increased, sprays having larger droplet sizes will result. The degree of atomization depends also, as explained before, upon the fluid properties of the feed material, where higher values of viscosity and surface tension result in larger droplet sizes for the same amount of available energy for atomization.

II. Spray-Air Contact

The manner in which spray contacts the drying air is an important factor in spray dryer design, as this has great bearing on dried product properties by influencing droplet behavior during drying. Spray-air contact is determined by the position of the atomizer in relation to the drying air inlet. Many positions are available. The spray can be directed into hot air entering from the top of the drying chamber. Product and air pass through the drying in "co-current" flow, so called after the inlet-outlet layout for air, feed, and dried products. Product temperature is low during the time the bulk of the evaporation takes place as droplet temperatures approximate to wet bulb temperature levels. When the desired moisture content is being approached, each particle of the product does not rise substantially in temperature as the particle is then in contact with much cooler air. In fact, low temperature conditions prevail virtually throughout the entire chamber volume, in spite of very high air entering the chamber. Both rotary and nozzle type atomizers can be used in co-current flow dryers.

Alternatively, the spray can be contacted with air in "counter-current" flow. Spray and air enter at the opposite ends of the dryer. This arrangement offers dryer performance with excellent heat utilization, but it does subject the driest powder to the hottest air stream.

Fast heating of the droplets produces a dry skin of silica trapping water inside the hollow sphere. Evaporation and evolution of the trapped water tends to produce a hole through the spherical grains obtained as a product.

There are dryer designs that incorporate both "co-current" and "counter-current" layouts, i.e. mixed flow dryers. This type of design can also be used to prepare our compositions.

III. Drying of Spray

When the droplets of the spray come into contact with the drying air, evaporation takes place from the droplet surface. Evaporation takes place in two stages described in the art (K. Masters, loc. cit.).

At first there is sufficient moisture within the droplet to replenish that lost at the surface. Diffusion of moisture from within the droplet maintains saturated surface conditions and as long as this lasts, evaporation takes place at a constant rate. This is termed in the art the first period of drying. When the moisture content is reduced to a level, where it is insufficient to maintain saturated conditions, the so-called critical point is reached and a dried shell forms at the droplet surface. Evaporation is now dependent upon the rate of moisture diffusion through the dried surface shell. The thickness of the dried shell increases with time causing a decrease in the rate of evaporation. This is termed in the art the falling rate period or second period of drying.

During evaporation the atomized spray distribution undergoes change. The extent of any PMG shape change and hence the dried powder characteristics is closely connected to the drying rate which is in turn related to the feeding rate, the type of spray-air contact (co-current, counter-current or mixed flow), the inlet and outlet temperature, and the air flow.

Increase in the inlet temperature increases the dryer evaporative capacity at constant air rate. Higher inlet temperatures mean a more economic dryer operation. Increased temperature also produces increased micrograin size due to expansion of the droplet and therefore reduction in bulk density. Generally the following air is at a temperature of from 130° C. to 400° C. with from 150° C. to 300° C. being the preferred range.

Air flow rate controls to a certain extent product residence time in the drying chamber. Increased residence time leads to greater degree of moisture removal. Reduction in air velocity assists product recovery from drying chamber. Increased air velocity produces faster evaporation rate, grain shape distortion and fracture.

Fast evaporation causes hollowness and even fracture of the grains. For this reason factors affecting drying rate have to be controlled to prevent, moderate or promote hollowness of the grains depending on the characteristics desired for each product.

IV. Separation of Dried Product from the Air

Product separation from the drying air follows completion of the drying stage when the dried product remains suspended in the air. Two systems can be used to cover the product. In one case the primary separation of dried product takes place at the base of the drying chamber. In the second case total recovery of dried product takes place in the separation equipment.

V. Acid Washing

An acid-washing may be carried out to reduce the sodium content of the particles and to remove trace impurities such as iron. Generally this is carried out at elevated temperatures such as 50° C. to 100° C. for 0.5 to 5 hours in a fairly volatile strong mineral acid such as 20–50% or concentrated nitric or hydrochloric acid. Sols prepared by certain techniques such as hydrolysis of ethyl silicate may contain no alkali or alkaline earth oxides and acid-washing is not required. Acid-washing is only used if there is alkali or alkaline earth oxide brought in with the sol in spray drying. Even after deionizing some sodium is left. For instance, the spray-dried particles from deionized Ludox® SM contain 0.26 wt.% sodium as determined by flame emmission, whereas the same after acid-washing contain 0.04 wt.% sodium as determined by flame emission. Generally speaking, it is desirable if the total content of potassium, sodium and calcium oxides does not exceed 0.1% and preferably is less than 0.01%.

VI. Sintering

After the acid-wash a strengthening step is required. Generally the sintering is carried out at from 700° C. to 1050° C. for from 30 minutes to 24 hours, depending on the sol particle size and the concentration of residual alkali or alkaline earth oxides. It is well known that if there is steam or moisture in the atmosphere the sintering can proceed at a lower temperature. The key to the sintering step is that the surface area of the aggregates should be reduced from 5 to 20% of the initial value to produce the desired increase in mechanical strength of the particle.

The optimum loss of surface area will depend on the size of the constituent colloidal particles. With particles made with 8 nm sol, a sintering to bring about only a 5% decrease in surface area generally is sufficient. With 80 nm particles, which initially form rather fragile spheroids after spray-drying, heating may be continued until the surface area loss amounts to 20%. However, high surface loss is to be avoided because of undesired loss of internal porosity, or the PMG themselves sticking together which also is very undesirable.

After the strengthening step the PMG are sized. For particles larger than about 30 μm this is conveniently done by screening. Particles less than 30 μm are conveniently air-classified with a device such as the Alpine Model 100 MZR laboratory zigzag classifier from Alpine American Corp., Natick, Mass. Ninety % of the aggregates in any given size classification will be within 0.5X to 1.5X where X is the weight average size aggregate particle in such size classification with 0.8X to 1.2X being the preferred range. Generally the average size particles for a given classification of PMG will be from 3 to 100 micrometers with from 5 to 80 micrometers being the preferred range.

DESCRIPTION OF THE PREFERRED EMBODIMENTS

The commercially available silica aquasols reported in Table I prepared by the process of Example 3 of U.S. Pat. No. 2,574,902, issued Nov. 13, 1951 to Max F. Bechtold and Omar E. Snyder, having the average particle diameter of 24 nm, but with ammonia exchanged for sodium as the base-stabilizing agent, is diluted to 10% $SiO_2$ and deionized in accordance with the process of U.S. Pat. No. 2,577,485, issued Dec. 4, 1951 to Joseph M. Rule. One hundred parts by weight of this diluted sol are stirred for 3 hours with 10 parts by weight of the hydrogen form of a sulfonated polystyrene ion exchange resin, the resin is drained out, and the silica aquasol is then mixed with 10 parts by weight of a cation exchange resin in the hydrogen form and 10 parts by weight of an anion exchange resin in the hydroxyl form, to remove the last traces of anions and cations.

The deionized sol is filtered to remove traces of resin, and is spray-dried using two-fluid atomization. This type of drier is described in "The Chemical Engineer's Handbook", 3rd Edition, by John H. Perry, at page 480. The air inlet temperature is 300° C. and the air outlet temperature is 110° C. The dried powder is separated from the air stream in a cyclone-type separator and a dust bag filter.

An acid treatment is carried out to reduce the sodium content of the particles and to remove trace impurities such as iron. For example, 120 g of the sample is heated in a polytetrafluoroethylene beaker with 300 ml of concentrated (70%) nitric acid on a steam bath at >90° C., with occasional stirring for 2 hours. The slightly yellow supernatent liquid is filtered off and the treatment repeated until a colorless supernatent occurs. The acid is removed by repeated slurrying in distilled water. Finally, the particles are boiled twice in 300 ml of distilled water to insure complete acid removal. At this point the pH as measured by test paper is 6.5. The acid-free particles are filtered and dried at 150° C. for 4 hours in a circulating air oven.

To insure the mechanical rigidity of the original aggregates, a sintering process is utilized. One-half gram samples of the dried, acid-washed powder are heated for 2 hours at various temperatures and surface areas determined by the one point nitrogen flow method.

Table II is a test on a typical sample which originally had a surface area of 110 square meters per gram.

TABLE II

| Sintering Temperature °C | Nitrogen surface area $m^2/g$ |
|---|---|
| unfired | 110 |
| 750 | 80 |
| 800 | 79 |
| 850 | 55 |
| 900 | 33 |
| 950 | >1 |
| 1000 | >1 |
| 1050 | >1 |
| 1100 | >1 |

Following these results the rest of the acid-washed sample is heated at 800° C. for 2 hours in air. This main fraction exhibited a nitrogen surface area of 89 $m^2/g$ as determined by the one-point nitrogen flow method. As shown in FIG. 3, mercury porosimetry measurements indicate a narrow meso pore size distribution with a mean internal pore diameter of 60 Å. In the plot shown in FIG. 3 the abscissa is the pore diameter in micrometers (μm) and the ordinate is the change in pore volume ($cm^3$) with change in mercury pressure (psi) ($\Delta V/\Delta P$). The large peak at about 10 μm represents the macro pores between the silica PMG. The specific porosity of this particular sample was 0.22 cc/g as measured by mercury porosimetry. A porosity of 0.22 cc/g corresponds to 0.22 cc of pores per gram of silica which has a density of 2.2 g/cc so that 1 g occupies 0.455 cc. Thus, the volume % of silica in the aggregates equals $$\frac{0.45}{0.22 + 0.45}$$

or $0.671 \times 100$, i.e., 67.1%. Thus, these aggregates are 67.1 vol % silica and 32.9 vol % pores. The fired sample is then sized using stainless steel sieves with the following result.

TABLE III

| Size μm | Weight g. | Weight % |
| --- | --- | --- |
| greater than 53 | 42.5 | 36.4 |
| 44–53 | 20.8 | 17.8 |
| 38–44 | 19.9 | 17.1 |
| less than 38 | 33.4 | 28.7 |
| Total | 116.6g. | 100.0% |

Within these two fractions 44–53 μm and 38–44 μm are well within the preferred range of 0.8X to 1.2X the average diameter of X.

Figure 5:
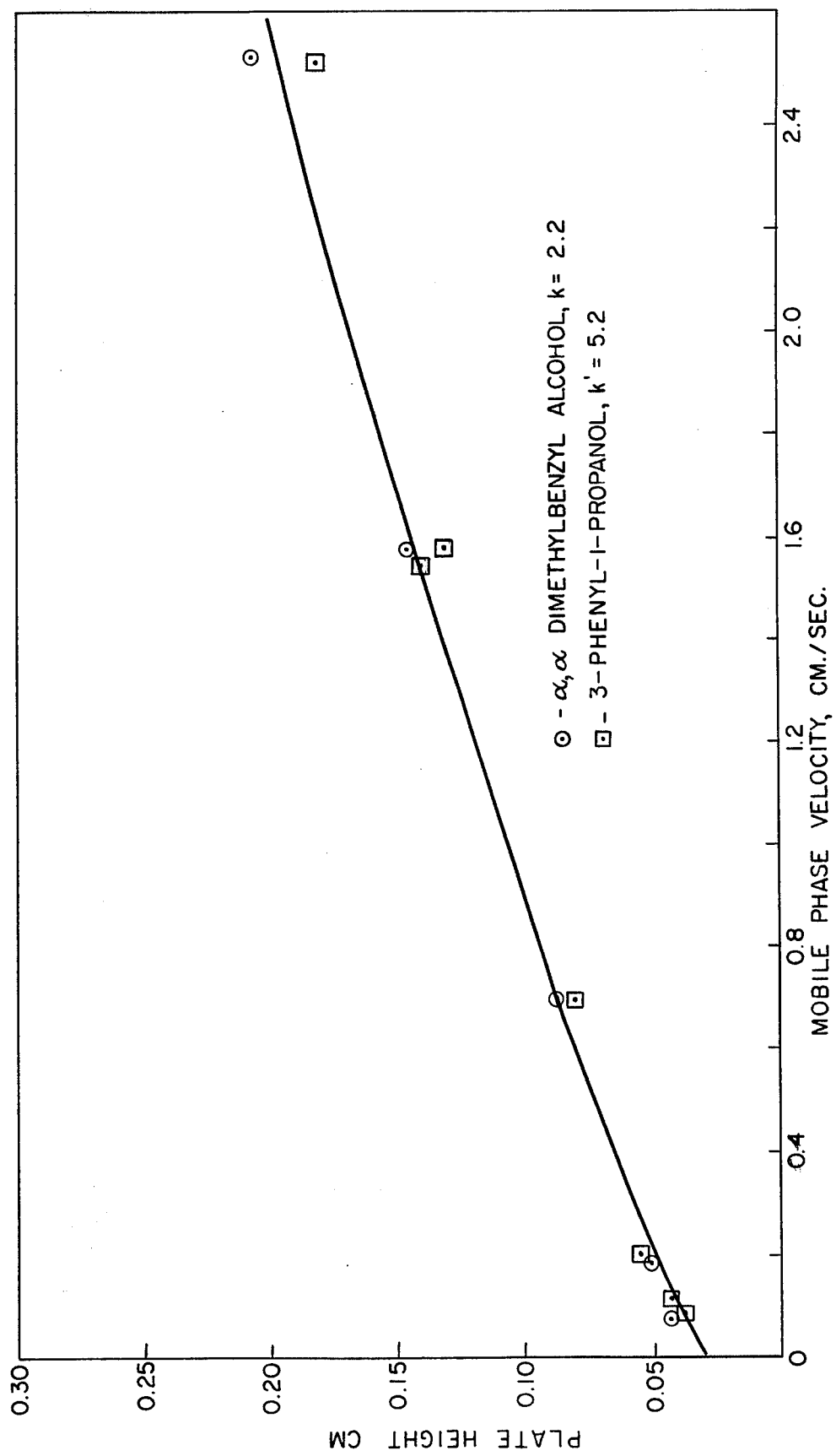
FIG. 5 is a plot showing plate height versus mobile phase velocity for two solutes.

A 50 cm long by 0.21 cm inside diameter stainless steel column containing the 38–44 μm silica aggregate particles described above is prepared by the "tap-fill" dry-packing technique given in L. R. Snyder and J. J. Kirkland, "Introduction to Modern Liquid Chromatography", John Wiley & Sons, New York, 1974, Chapter 6, using a custom-made packing machine. FIG. 4 shows the separation of some aromatic alcohols carried out on this column using the liquid-solid (adsorption) chromatographic mode at 60 psi and a flow rate of 0.23 ml/min. When operated under these conditions, this column exhibited about 1000 theoretical plates for the last peak in this chromatogram. Because of the spheroidal nature of these silicate aggregate particles, the column apparently is packed uniformly, and the packed bed exhibits relatively high permeability for the particle size range used. FIG. 5 shows plate height versus mobile phase velocity date for the same column obtained for two solutes with different capacity factor, k', values using 24% $CH_2Cl_2$, 74% hexanes and 2% acetonitrile as the solvent. From these data it is apparent that the particles exhibit favorable solute mass transfer characteristics; plate heights do not increase values with increasing capacity factors for solutes. Relatively modest increase in plate height with increasing mobile phase velocity is exhibited by the column of these spray-dried silica PMG, indicating good column efficiency at relatively high mobile phase flow-rates.

Figure 6:
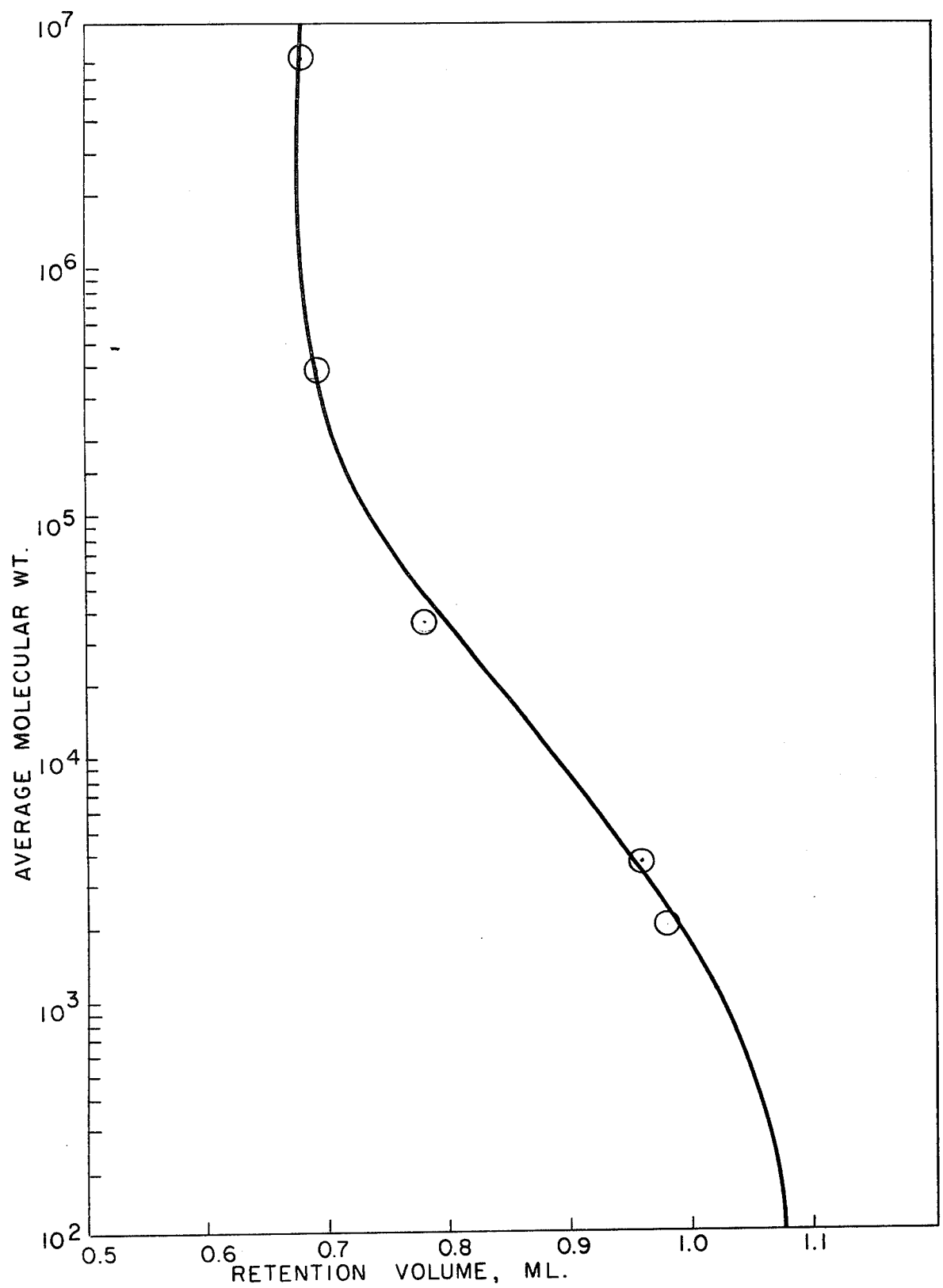
FIG. 6 is a plot of the molecular weight versus retention volume calibration for a series of polystyrenes.

Since the silica PMG exhibit narrow pore size distribution, they have utility in size-exclusive chromatography for separating macromolecules by differences in hydrodynamic size. FIG. 6 shows the molecular weight versus retention volume calibration for a series of polystyrenes at 23° C., 130 psi, a flow rate of 0.5 ml/min with a 25 μl sample of 2.5 mg polystyrene/ml solution on the silica PMG described above (mean pore diameter, 60° A). The approximate linear molecular weight fractionation range for this packing is from about $2 \times 10^3$ to $1 \times 10^5$. This relatively narrow fractionation range is indicative of the narrow pore-size distribution range of the silica PMG which is important in maintaining high resolution in the size-exclusion process.

The spray drying step of Example 1 is repeated using different silica aquasols having different particle sizes and typical results are reported in Table IV.

TABLE IV

ULTIMATE PARTICLE DIAMETER VS. MEDIAN MESOPORE DIAMETER OF POROUS SPHERICAL MICROGRAIN (PMG)

| Ex. No. | Grade | Average Ultimate Particle Diameter, nm | Median Pore Diameter of RMG, A | $f = \frac{D\ pore}{D\ particle}$ | Typical Specific Surface Areas of Starting Sol $m^2/g$ | Typical Specific Surface Areas of PMG After Sintering $M^2/g$ |
| --- | --- | --- | --- | --- | --- | --- |
| 2 | Nalcoag 1060 | 63 | 170 | 0.27 | 50 | 45 |
| 3 | Ludox® AS-40 | 21 | 60 | 0.28 | 130 | 110 |
| 4 | Ludox® AS-30 | 12 | 40 | 0.33 | 230 | 200 |
| 5 | Ludox® SM | 7 | 40 | 0.57 | 360 | 310 |

We claim:

1. A process for making amorphous spheroidal silica grains having a packed bulk density of from 30 to 40% of the theoretical density of amorphous silica which comprises the steps of:
   (a) spray-drying with flowing air at a temperature from 130° C. to 400° C. a silica sol containing from 5 to 60 weight percent essentially non-aggregated spherical silica particles of uniform size wherein at least 75% of the particles have a diameter of from 0.5D to 2D where D is the weight average diameter and D is from 5 to 80 nanometers to form porous micrograins from 30 to 100 micrometers in diameter, containing at least 55 volume percent silica, and
   (b) sintering the porous micrograins to reduce the surface area thereof from 5% to 20%.

2. The process of claim 1 wherein the porous micrograins are classified so that at least 90% of the porous micrograins in a class have a diameter in the range of 0.5X to 1.5X where X is the weight average diameter of the porous micrograins in a class and X is from 3 to 100 micrometers.

3. The process of claim 2 wherein the spray-dried silica is washed with a strong mineral acid to reduce the sodium oxide, potassium oxide, and calcium oxide thereof to less than 0.1 percent by weight.

4. The process of claim 3 wherein X is from 5 to 80 micrometers.

5. The process of claim 4 wherein the silica sol is fed as a spray to the spray-dryer with flowing air at from 150° to 300° C.

6. The process of claim 5 wherein the particles in the silica sol have an average diameter of from 8 to 80 nanometers.

7. The process of claim 6 wherein one sintering step reduces the surface area of the particles from 10% to 15%.

8. The process of claim 7 wherein 90% of the porous micrograins in a classification are from 0.8 to 1.2X.

9. The product of the process of claim 3.

10. A process of separating by chromatography comprising passing a material to be separated through a separation column packed with a hereinbelow described class of amorphous spheroidal silica porous micrograins having a packed density of from 30% to 40% of the theoretical density of amorphous silica prepared by the steps of:
  (a) spray drying with flowing air at a temperature of from 130° C. to 400° C. a silica sol containing from 5 to 60 weight percent essentially non-aggregated amorphous spherical silica particles of uniform size wherein at least 75% of the particles have a diameter of from 0.5D to 2D where D is the weight average diameter and D is from 5 to 80 nanometers to form porous micrograins from 3 to 100 micrometers in diameter, containing at least 55 volume percent silica,
  (b) sintering the porous micrograins to reduce the surface area thereof from 5% to 20%, and
  (c) classifying the porous micrograins so that at least 90% of the porous micrograins in a class have a diameter in the range of 0.5 to 1.5X where X is the weight average diameter of the porous micrograins in a class and X is from 3 to 100 micrometers and separating the material into components.

11. A process of separating materials by liquid chromatography comprising passing a material to be separated through a separation column packed with hereinbelow described class of amorphous spheroidal silica porous micrograins having a packed density of from 30% to 40% of the theoretical density of amorphous silica prepared by the steps of:
  (a) spray drying with flowing air at a temperature of from 130° C. to 400° C., a silica sol containing from 5 to 60 weight percent essentially non-aggregated amorphous spherical silica particles of uniform size wherein at least 75% of the particles have a diameter of from 0.5D to 2D where D is the weight average diameter and D is from 5 to 80 nanometers to form porous micrograins from 3 to 100 micrometers in diameter, containing at least 55 volume percent silica,
  (b) sintering the porous micrograins to reduce the surface area thereof from 5% to 20%, and
  (c) classifying the porous micrograins so that at least 90% of the porous micrograins in a class have a diameter of from 0.5 to 1.5X where X is the weight average diameter of the porous micrograins in a class and X is from 3 to 100 micrometers and separating the material into components.

* * * * *

UNITED STATES PATENT OFFICE
CERTIFICATE OF CORRECTION

PATENT NO. : 4,131,542
DATED : December 26, 1978
INVENTOR(S) : Horacio Enrique Bergna & Joseph Jack Kirkland It is certified that error appears in the above-identified patent and that said Letters Patent are hereby corrected as shown below:

In claim 1, line 12, "30" should read --3--.

Signed and Sealed this

Eighteenth Day of September 1979

[SEAL]

Attest:

LUTRELLE F. PARKER
Attesting Officer      Acting Commissioner of Patents and Trademarks